Figure 9:
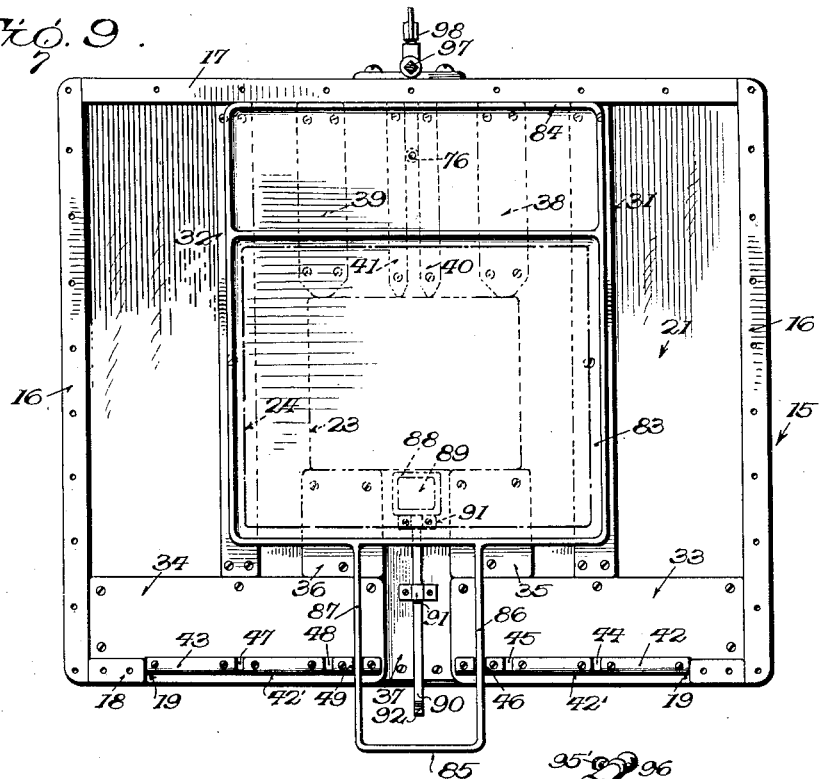

June 11, 1935.  W. A. WEED  2,004,232
X-RAY OR RADIOGRAPHIC APPARATUS
Filed June 14, 1933  5 Sheets-Sheet 1
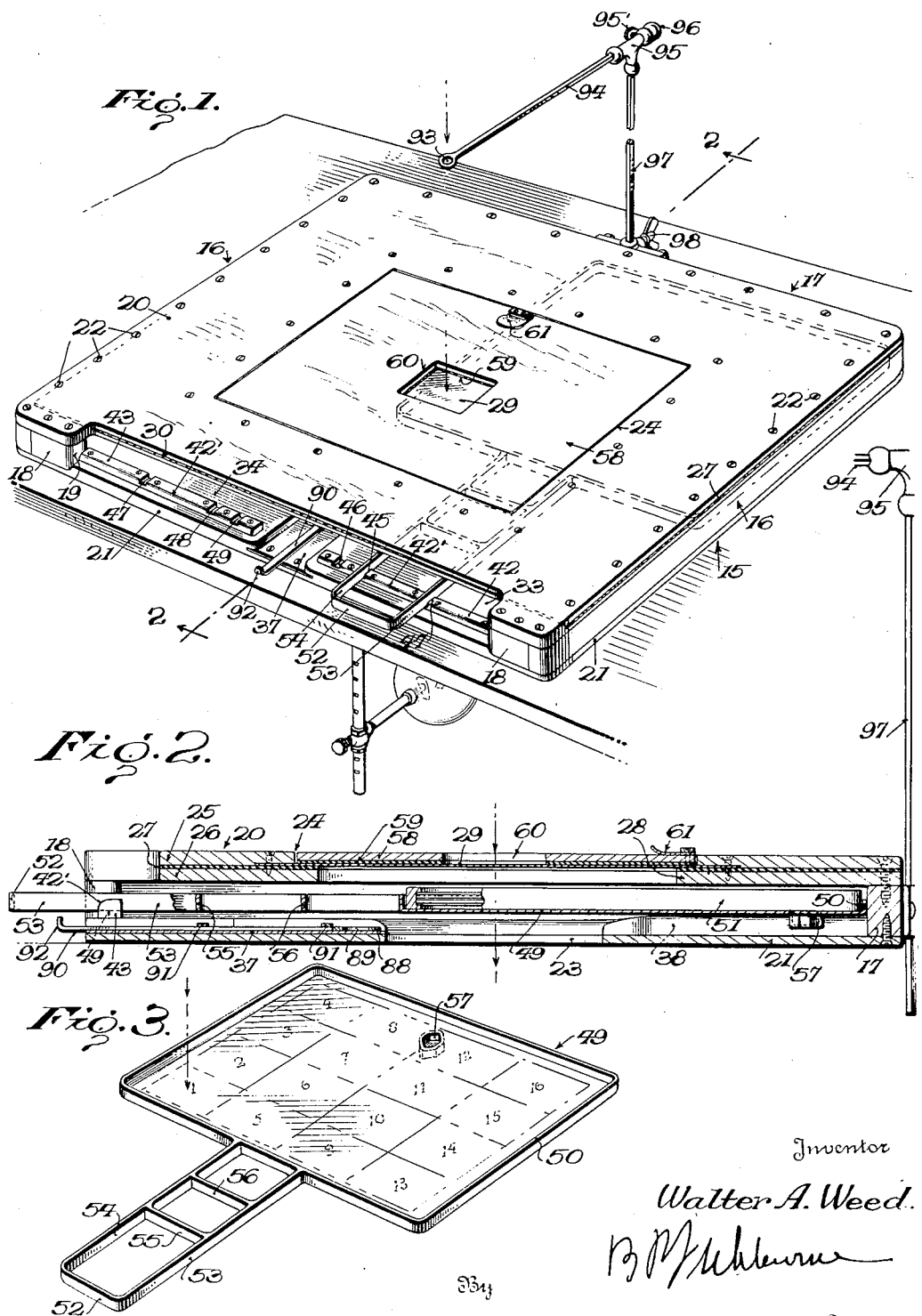
Inventor
Walter A. Weed.
Attorney

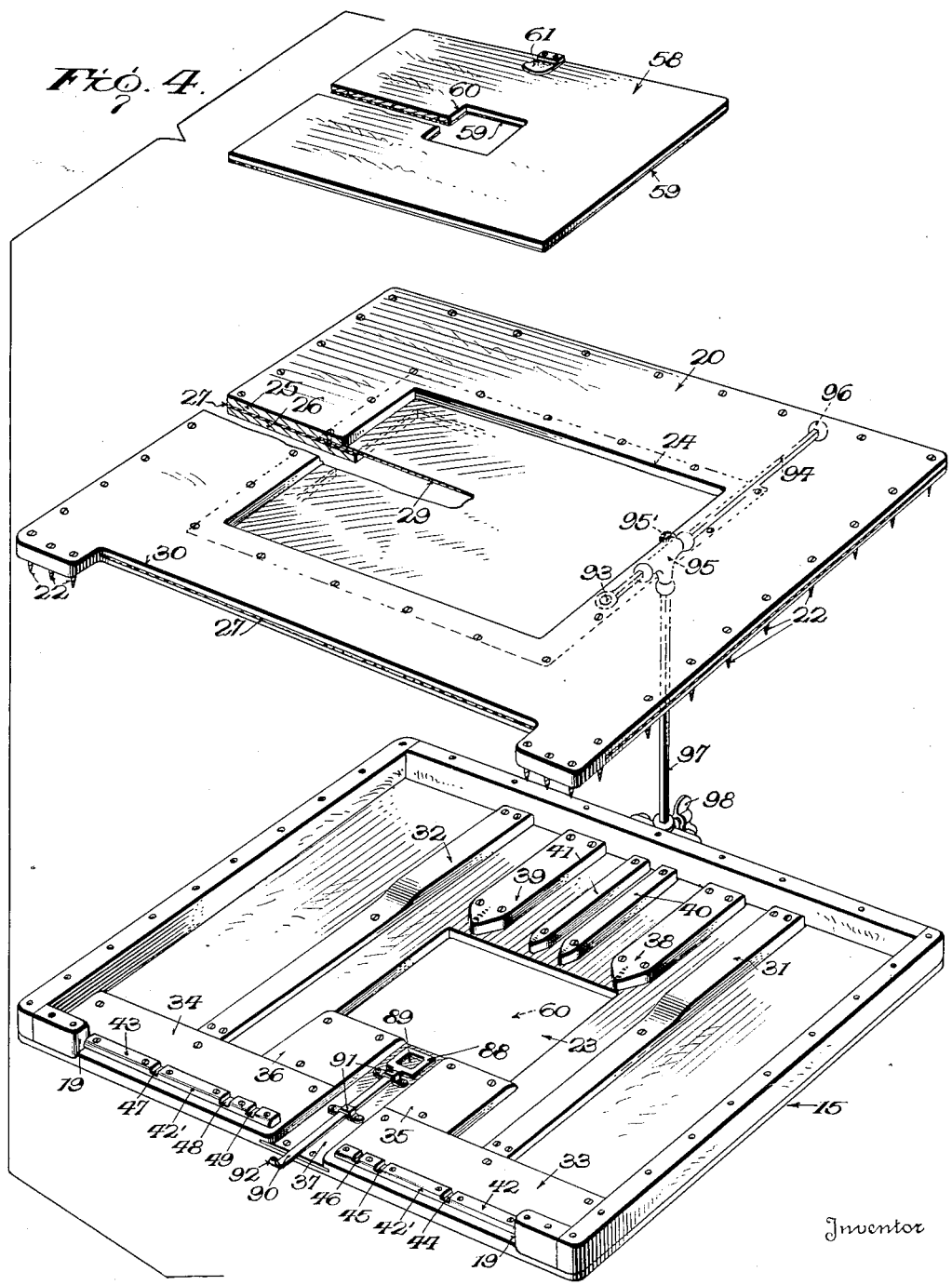

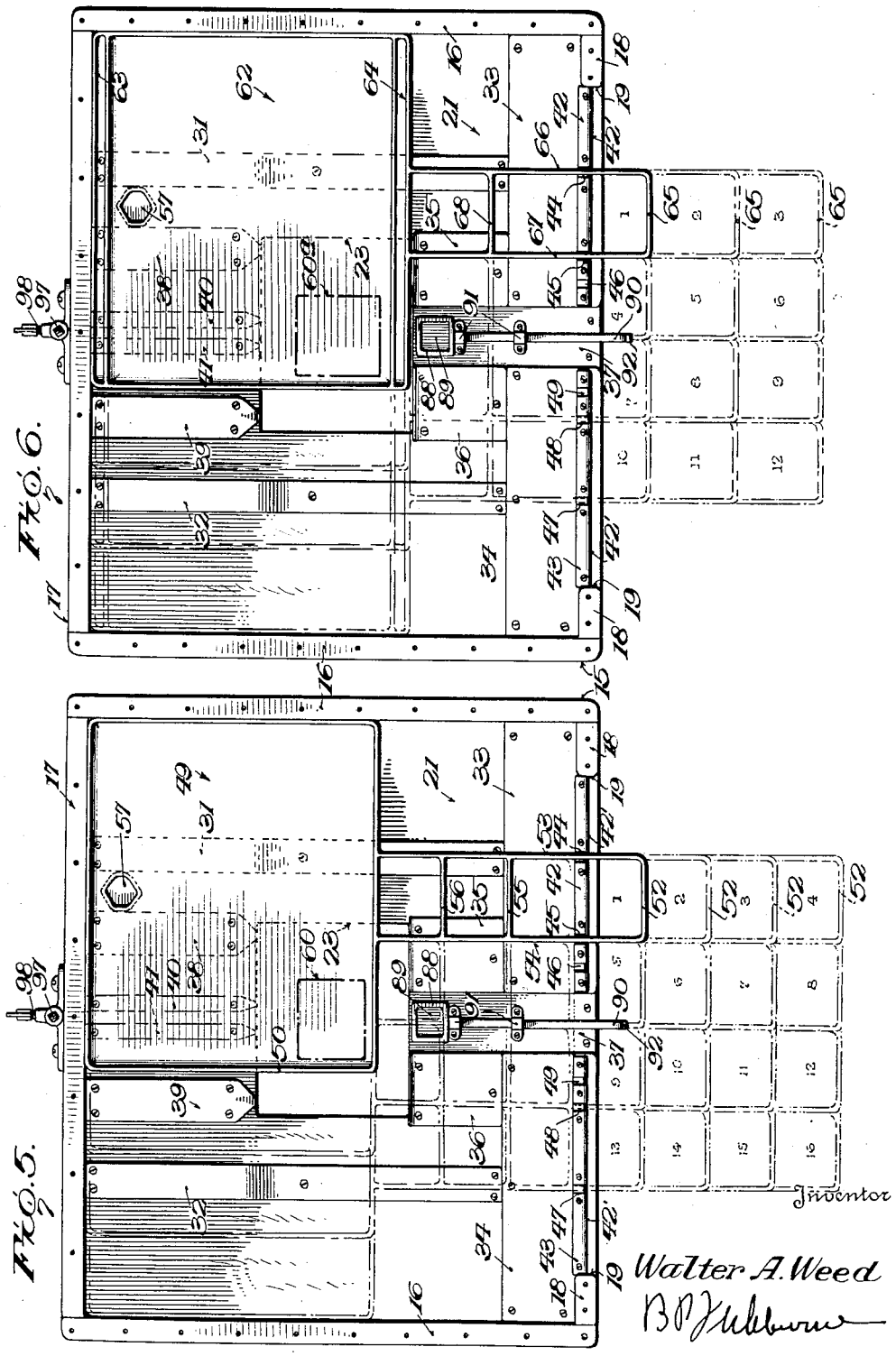

June 11, 1935.  W. A. WEED  2,004,232
X-RAY OR RADIOGRAPHIC APPARATUS
Filed June 14, 1933  5 Sheets-Sheet 4
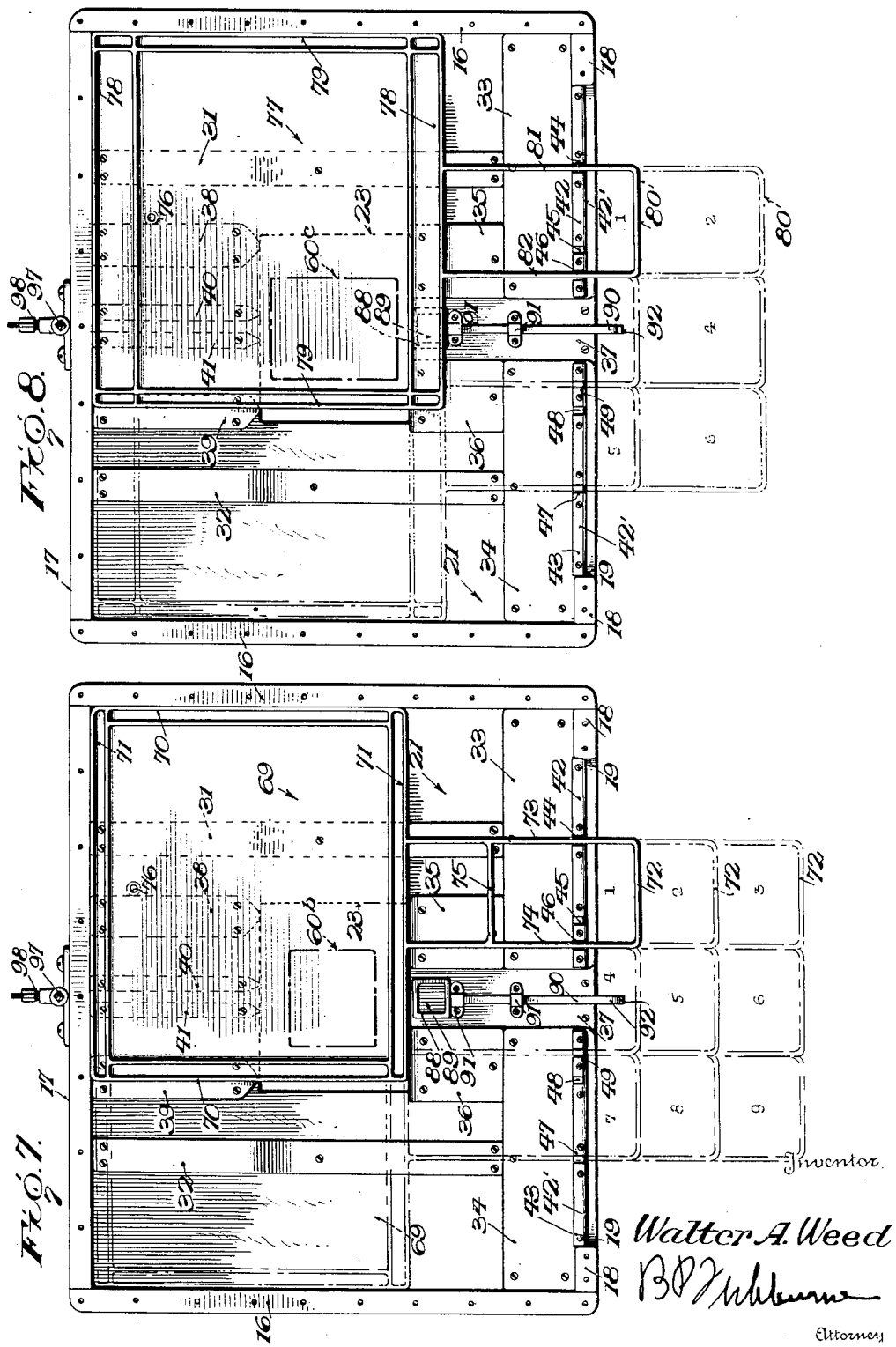
Inventor
Walter A. Weed
Attorney June 11, 1935. W. A. WEED 2,004,232
X-RAY OR RADIOGRAPHIC APPARATUS
Filed June 14, 1933 5 Sheets-Sheet 5

Inventor
Walter A. Weed
Attorney

Patented June 11, 1935

2,004,232

UNITED STATES PATENT OFFICE 2,004,232

X-RAY OR RADIOGRAPHIC APPARATUS

Walter A. Weed, Lakeland, Fla.

Application June 14, 1933, Serial No. 675,808

15 Claims. (Cl. 250—34)

My invention relates to improvements in X-ray or radiographic apparatus.

An important object of the invention is to provide apparatus of the above-mentioned character, so constructed that a plurality of pictures may be quickly and accurately taken upon a single plate or film.

A further object of the invention is to provide apparatus of the above-mentioned character, so constructed that the cassette support is guided in its movements when shifted to the exposure positions, and positively held in the exposed position against accidental displacement.

A further object of the invention is to provide apparatus of the above-mentioned character, so constructed that the cassette support may be manually shifted to the various exposure positions without the employment of lever or levers.

A further object of the invention is to provide apparatus of the above-mentioned character, so constructed that the cassette support is properly guided and held in the exposure position when a single large picture is being made.

A further object of the invention is to provide apparatus of the above-mentioned character, having the maximum range of adjustment whereby practically any number of pictures may be taken upon a single plate or film, as may be desired.

A further object of the invention is to provide a plurality of window elements which are bodily insertable and removable within the main maximum window of the apparatus, rendering it possible to take pictures upon the film or plate, in practically any desired number.

A further object of the invention is to provide apparatus of the above-mentioned character, which is of extremely simple construction, and may be quickly and accurately operated.

A further object of the invention is to provide means whereby the patient may be given a fluoroscopic examination, and the precise location of the suspected part of the body ascertained, whereby the body may be marked for indicating such location.

A further object of the invention is to provide apparatus of the above-mentioned character, so constructed that the part of the body to be radiographed is brought into close relation to the plate or film.

A further object of the invention is to provide means whereby the patient, having a skin mark upon his body, indicating the position of the suspected portion to be radiographed, may be brought to the precise proper position over the apparatus so that the suspected portion will be properly centered in the picture or pictures taken.

Other objects and advantages of the invention will be apparent during the course of the following description.

Figure 10:
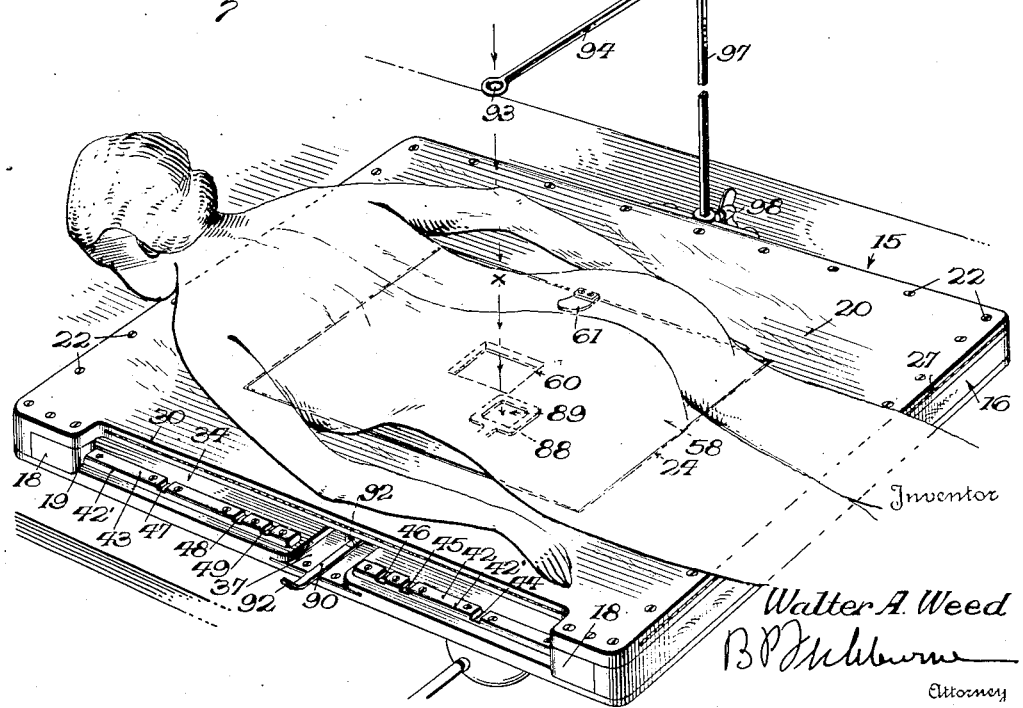

In the accompanying drawings, forming a part of this specification, and in which like numerals are employed to designate like parts throughout the same, Figure 1 is a perspective view of X-ray or radiographic apparatus embodying my invention, Figure 2 is a transverse vertical section taken on line 2—2 of Figure 1, Figure 3 is a perspective view of the cassette support, Figure 4 is a perspective view of the several parts of the apparatus, the same being separated and in the position that they would assume when being assembled, parts omitted, Figure 5 is a plan view of the apparatus, with the top of the supporting structure omitted, the various exposure positions of the cassette support being indicated in dotted lines, for producing sixteen pictures, Figure 6 is similar view, the cassette support being shiftable to various exposure positions for producing twelve pictures, Figure 7 is a similar view, the cassette support being shiftable to exposure positions for producing nine pictures, Figure 8 is a similar view, the cassette support being shiftable to exposure position for producing six pictures, Figure 9 is a similar view, the cassette support serving to produce one large picture, Figure 10 is a perspective view of the apparatus indicating the use of the means to locate or center the suspected part of the body upon the apparatus.

In the drawings, wherein for the purpose of illustration is shown a preferred embodiment of my invention, the numeral 15 designates a supporting structure or casing, which is flat and relatively thin. This supporting structure is adapted to be placed upon a table or other support, and the patient laid upon the same, ordinarily face down, as indicated in Figure 10. The supporting structure or casing comprises ends 16 and sides 17 and 18, the side 18 having an opening or passage 19 formed therein and extending throughout the major portion of its length, for the free passage of the cassette support. The supporting structure or casing further comprises a top 20 and a bottom 21, which are rigidly attached to the ends and sides by screws 22, or other suitable means. The bottom 21 is provided at its center with a window 23, which is preferably rectangular, and the top 20 is provided centrally thereof with a main window 24, preferably rectangular, the windows 23 and 24 having their centers coinciding, and their edges preferably parallel. The top 20 is impervious to X-rays, as far as possible, and for this purpose the top may be formed of sheets 25 and 26, and between this sheet is arranged a lead sheet 27.

At the marginal edges of the window, the lower sheet 26 projects inwardly beyond the upper sheet, forming a shoulder 28, and the lead sheet 27 extends to this shoulder. A supporting member or plate 29 is provided, which may be formed of aluminum or other material, which will permit of the proper passage of X-rays, and this supporting plate or member is arranged upon the shoulder 28 and preferably extends for a short distance between the sheets 25 and 26. The main window 24 therefore, has its top open, while the supporting member or plate 29 is arranged beneath this open top. The various portions of the supporting structure or casing may be formed of wood, where material is not otherwise stated, but the invention is in no sense restricted to the use of wood, as other material may be employed, as is obvious. The top 20 is preferably cut away adjacent to the opening 19, affording a recess 30, as shown.

Arranged within the supporting structure or casing 15 are guide elements or rails 31 and 32, disposed upon opposite sides of the window 23, and spaced from the same for equal distances, and also spaced from the ends of the supporting structure for equal distances, as clearly shown in Figure 4. These guide elements or rails are rigidly attached to the bottom 21 by screws, or the like. Filler elements or strips 33 and 34 are arranged within the supporting structure and rigidly attached to the bottom 21 by screws, or the like, and are disposed adjacent to the rear ends of the guide elements or rails 31 and 32. Filler elements or strips 35 and 36 are also secured to the bottom 21 by screws, or the like, and are disposed upon the inner side of the strips 33 and 34, respectively, adjacent to their inner ends. The strips 33 and 34 have their inner ends spaced and the strips 35 and 36 have their inner sides spaced, affording a groove or passage 37, extending transversely of the casing or supporting structure, for a purpose to be described.

The numeral 38 designates a guide element or rail rigidly attached to the bottom 21 upon the forward side of the window 23. The rail 38 has its outer edge spaced a proper distance from the rail 31, and this outer edge is preferably disposed slightly outwardly of the adjacent end of the window 23. A guide element or rail 39 is rigidly secured to the bottom 21, adjacent to the opposite end of the window 23, and the outer edge of the rail 39 is spaced a suitable distance from the adjacent rail 32 and this outer edge is preferably arranged slightly outwardly of the adjacent end of the window, as shown. The rail 38 is parallel with the rail 31 and the rail 39 is parallel with the rail 32, as shown. Arranged between the rails 38 and 39 are guide elements or rails 40 and 41, which are rigidly attached to the bottom 21. These rails 40 and 41 are parallel with the rails 38 and 39. The rail 40 is spaced from the rail 38 for substantially the same distance that the rail 38 is spaced from the rail 31, and the rail 41 is spaced from the rail 39 substantially the same distance that the rail 39 is spaced from the rail 32. The rail 38 is spaced from the rail 31 the same distance that the rail 39 is spaced from the rail 32. The rail 40 is spaced from the rail 41 a considerably shorter distance than the rail 38 is spaced from the rail 31, as shown. The spacing of the several rails provides grooves or guide-ways of different widths, for a purpose to be described.

The numerals 42 and 43 designate bars or elements which serve as combined guide and stop devices. The bar 42, see Figs. 4 to 8, inclusive, has a transverse notch or groove 44, preferably arranged in alignment with the central longitudinal axis of the rail 31; a transverse notch or groove 45, preferably arranged in alignment with the central longitudinal axis of the rail 38; and a transverse notch or groove 46, disposed opposite the space between the rails 38 and 40 and nearer the rail 38. The bar 43 has a transverse notch or groove 47, preferably disposed in alignment with the central longitudinal axis of the rail 32; a transverse notch or groove 48, preferably disposed in alignment with the central longitudinal axis of the rail 39, and a transverse notch or groove 49 arranged opposite the space between the rails 39 and 41, and nearer the rail 39. While I have shown a plurality of notches or grooves formed in a continuous bar, it is obvious that the invention is not restricted to the use of the continuous bar, and the several parts of the bar having the notches or grooves are regarded as combined guiding and stopping devices. The bottom walls of the notches or grooves formed upon the bars 42 and 43 are at the elevation of the top surfaces of the rails 31, 32, 38, 39, 40 and 41, the rear portions of the rails 31 and 32 being elevated, as shown, so that the top surfaces of all the rails have the same elevation. The purpose of this is to hold the cassette support level within the supporting structure.

Attention is now called particularly to Figures 3 and 5, wherein is shown a cassette support or tray 49, for making sixteen pictures upon a single film or tray. This support or tray is preferably provided with a marginal flange 50, so that the cassette 51 may be held upon the cassette support without liability of displacement. Rigidly connected with the rear side of the cassette support or tray 49 is a generally U-shaped handle 52, embodying spaced parallel sides or bars 53 and 54. The bars 53 and 54 are connected by transverse stop bars 55 and 56. The stop bar 56 is spaced from the cassette support or tray 49 the same distance that the stop bar 55 is spaced from the stop bar 56, and when the cassette support or tray 49 is within the supporting structure, in the first exposure position, the stop bar 55 is spaced from the bar 42 the same distance that the stop bar 55 is spaced from the stop bar 56. The cassette support or tray 49 is provided with a guide element 57, projecting downwardly below the same. This guide element has a sufficiently large diameter so that it will pass between rails 31 and 38; rails 38 and 40; rails 41 and 39; and rails 39 and 32; but will not pass between rails 40 and 41. The guide element engages the outer edges of the rails 38 and 39, and may also engage the inner edges of the rails 31 and 32, but satisfactory results are obtainable by having the guide element engage with the rails 38 and 39, with the exclusion of the rails 31 and 32, if desired, the side of the cassette support or tray 49 engaging with the ends of the box. For the purpose of clarifying the description, an explanation as to the shifting movements of each cassette support or tray will be given in connection with a description of the same. Adapted for use in connection with the cassette support or tray, for producing sixteen pictures, is a window element 58, rendered impervious to X-rays by being provided with a lead sheet 59. This window element is provided at its center with a window 60. The window element is adapted to be inserted downwardly into the main window 24, and rests upon the plate or supporting member 29, and is equipped with a lift element or tab 61, whereby it may be conveniently removed fom within the window. It will be noted that the edges of the lead sheets 27 and 59 are overlapped, as clearly shown in Figure 2. The window 60 is one-sixteenth of the area of the film or plate within the cassette support, and has the same width as the spaces between the stop bars 55 and 56, and the same length as the spaces between the notches or grooves 44 and 45, and 46 and 47, and the distance between notches 46 and 45 is twice that between notches 44 and 45.

The cassette support 49, Figure 5, is in the first exposure position for taking the first picture. The guide element 57 is in the forward position and engages the outer edge of the guide rail 38, while the forward side of the cassette support engages the forward side of the supporting structure and the right end of the cassette support engages the right end of the supporting structure. When the cassette structure is in the first exposure position, as described, the sides 53 and 54 of the handle are within the notches or grooves 44 and 45. It is thus seen that the cassette support is not only supported in a level position, but is securely locked or held in the exposure position against movement in all directions, except in a rearward direction toward the operator. There is therefore, no liability of the cassette support being accidentally displaced during the period of exposure. After the exposure has been completed in the operation of the X-ray in the usual manner, the cassette support is shifted to the second position, which is accomplished by the operator pulling the handle 52 rearwardly toward him, until the stop bar 55 engages the bar 42. The second exposure is now made. After this, the handle 52 is raised slightly so that the stop bar 55 may clear the bar 42, and the sides 53 and 54 are again lowered into the grooves or notches 44 and 45, and the handle 52 is shifted rearwardly until the stop bar 56 engages the bar 42, at which time the cassette support will be in the third exposure position. After the third exposure is completed, the handle is again slightly raised so that the stop bar 56 will clear the bar 42, and the sides 53 and 54 are again lowered into the grooves 44 and 45, and the handle is moved rearwardly until the edge of the cassette support engages the bar 42. The cassette support will then be in the fourth position. After the completion of the fourth exposure, the handle and cassette support are shifted to the left to bring the side 53 into the notch or groove 45, and the guide element 57 will be positioned to enter the space between the rails 38 and 40. With the side 53 within the groove, the handle is forced forwardly, the stop bars 56 and 55 tripping over the rear rounded edge 42' of the bar 42 until the forward side of the cassette support 49 engages the forward side of the support structure. The cassette support is now in the fifth exposure position, and exposures 6, 7 and 8 are made by shifting the handle rearwardly as explained in connection with exposures 2, 3 and 4. After the completion of the eighth exposure, the handle 52 and cassette support are again shifted to the left to bring the side 54 into the notch or groove 46, the side 53 being at the center of the passage 37. The guide element 57 is now positioned to pass between rails 41 and 39. The handle is now forced forwardly, the stop bars 56 and 55 tripping over the rounded surface 42' of the bar 43. When the cassette support 49 engages the forward side of the supporting structure, the cassette support is in the ninth exposure position. The handle is now shifted rearwardly to bring the cassette support to exposure positions 10, 11 and 12, as explained in connection with the other exposure positions. After exposure 12 has been made, the handle and cassette are again shifted to the fourth position, to the left, so that side 54 enters the groove 47 and side 53 enters the groove 48, the guide element 57 being positioned to pass between rails 39 and 32, engaging with rail 39. The handle is again forced forwardly, the stop bars 56 and 55 tripping over the bar 43 and the cassette support is in the thirteenth exposure position when the cassette support engages the forward side of the supporting structure. The handle is again shifted rearwardly to move the cassette support to the fourteenth, fifteenth and sixteenth exposure positions, as is obvious. After the completion of the sixteenth exposure, the handle is manipulated to bodily remove the cassette support from within the supporting structure, so that the film or plate may be removed from the cassette and developed in the usual manner. It should be noted that the cassette support has two guiding means. The guide element 57 coacting with the rails constitutes one guide means, and the handle 52 coacting with the notches or guide devices, constituting another guide means. These two guide means coact for effecting a positive guiding movement of the cassette support during its shifting movement, and securely holding the same in the various exposure positions against accidental displacement. Some degree of success could be employed by using the handle guide means alone, or by using the cassette guide means alone, although it is preferred to use both guide means.

In Figure 6, I have shown a cassette support adapted for use in connection with the apparatus for producing twelve pictures. It is necessary to change the window element 56, and use another window element which is identical with the window element 58, except that the window 60 is larger and has an area corresponding to one-twelfth of the area of the film or plate, as indicated at 60a, in Figure 6. The cassette support shown in Figure 6 is designated by the numeral 62, and is similar to the cassette support 49, and has an internal dimension identical with the cassette support 49 for receiving the same size film or plate. The external dimensions of the cassette support 62 are increased at its forward and rear sides only, by extensions 63 and 64, since the cassette support 62 is to be shifted rearwardly to only three exposures, while it is shifted laterally to four exposures. A handle 65, somewhat similar to the handle 52 is rigidly attached to the cassette support 62. This handle includes spaced parallel sides 66 and 67, and a transverse stop bar 68 connecting them. The space between the sides 66 and 67 is equal to the length of the window 60a, while the space between the stop bar 68 and the edge of the cassette 62 is equal to the width of the window 60a, and the space between the stop bar 68 and the bar 42 is also equal to the width of the window 60a, when the cassette support is in the first exposure position, as shown in Figure 6. When the cassette support 62 is shifted to the first exposure position, Figure 6, its forward side engages the forward side of the supporting structure, and its right end engages the right end of the supporting structure, and side 66 of the handle is within the notch or groove 44 and side 67 within the notch or groove 45. After the completion of the first exposure, the handle 66 is pulled rearwardly until the stop bar 68 engages the bar 42, at which time the cassette support 62 will be in the second exposure position. After the completion of the second exposure, the handle is again manipulated as explained in connection with the cassette support 49, so that the cassette support may be shifted to the third exposure position, which is defined when the rear edge of the cassette support engages the bar 62. The cassette support has the same guide element 57 coacting with the various rails, and the cassette support 69 is shifted to the various lateral positions, to the left, as explained in connection with the cassette support 49, and the three exposure positions effected in each lateral position.

In Figure 7, I have shown a cassette support for use in connection with the apparatus for producing nine pictures upon the same size film. A window element identical with the window element 58 is employed, excepting that the window 60 is larger, as shown at 60$^b$, and this window 60$^b$ is one-ninth of the area of the film, which is of the same size as used in connection with cassette support 49. The cassette support is designated by the numeral 69, and has the same internal area as the cassette support 49, but its external area is increased, both longitudinally and transversely, by means of extensions 70 and 71, as the cassette support is shifted to but three exposure positions, both transversely and longitudinally of the supporting structure. The cassette support 69 has a handle 72, rigidly secured thereto, similar to the handle 52 and embodying sides 73 and 74, and a transverse stop bar 75, connecting these sides. The cassette support also has a guide element 76, projecting beneath the same, and this guide element is of much smaller diameter than the guide element 57. The distance between sides 73 and 74 is equal to the length of the window 60$^b$ and the distance between the bar 75 and tray 69 is equal to the width of the window 60$^b$, and the distance between the bar 75 and rail 42, when the cassette support is in the first position is equal to the distance between bar 75 and support 69. The guide element 76 is adapted to pass into the space between the rails 40 and 41, and is also arranged for engagement with the outer edges of the rails 38 and 39. When the cassette support 69 is in the first exposure position, Figure 7, the sides 73 and 74 enter notches or grooves 44 and 46, while guide element 76 engages the outer side of the rail 39, the forward side of the cassette support engages the forward side of the supporting structure, and the right end of the cassette support engages the right end of the supporting structure. After the first exposure has been made, the handle 72 is drawn rearwardly until the stop bar 75 engages the bar 42, and after this exposure has been made, the handle is again moved rearwardly so that the cassette support assumes the third exposure position with the edge of the cassette support in engagement with the bar 42. After the third exposure has been made, the handle and cassette support are shifted laterally and the side 73 inserted into groove 46, while side 74 is inserted into groove 49, the handle being then moved forwardly to bring the cassette support to the fourth exposure position, with its forward side engaging the forward side of the supporting structure, the guide element passing between the elements 40 and 41. The fifth and sixth exposure positions are obtained by moving the handle rearwardly, as is obvious. After the sixth exposure is completed, the handle and cassette are shifted laterally to the left, and the side 73 enters the notch or groove 49, while the side 74 enters the notch or groove 47, and the cassette support is moved forwardly to the seventh exposure position, the guide element 76 engaging the outer side of the rail 39, the forward side of the cassette support engaging the forward side of the supporting structure, and the left end of the cassette support engaging the left end of the supporting structure. After the seventh exposure is completed, the handle is moved rearwardly to bring the cassette support to the eighth and ninth position, as is obvious.

In Figure 8, I have shown a still further form of cassette support for use in making six pictures upon a film or plate of the same size as employed in connection with the cassette support 49. A window element identical with the window element 58 is used, excepting that the window 60 is larger, as indicated as 60$^c$. The window 60$^c$ has an area substantially equal to one-sixth of the area of the film or plate. The numeral 77 designates the cassette support having the same internal dimension as the cassette support 49, but having its external dimensions increased both laterally and longitudinally by means of extensions 78 and 79. This is necessary, as the cassette support is shifted transversely to only two exposure positions and longitudinally to only three exposure positions. A handle 80, similar to the handle 54, is rigidly secured to the cassette support 77, and embodies spaced sides 81 and 82, having no stop bars. The dimension of the window 60$^c$, longitudinally of the supporting structure, is equal to the space between the sides 81 and 82, and its dimension transversely of the supporting structure is equal to the space between the outer edge of the cassette support and the bar 42. The cassette support is provided with the same small guide element 76 coacting in the identical manner with the guide rails, as described in connection with Figure 7. When the cassette support 77 is in the first exposure position, the side 81 is arranged within the notch or groove 44, and the side 82 is arranged within the notch or groove 46, while the guide element 76 engages the outer edge of the rail 38, and the forward side of the cassette support engages the forward side of the supporting structure, and its right end engages the right end of the supporting structure. After the first exposure has been completed, the handle 80 is shifted rearwardly until the rear outer edge of the cassette support 77 engages the bar 42, the right end of the cassette support still engaging the right end of the supporting structure, and the cassette structure will then be in the second exposure position. After the completion of the second exposure, the handle 80 and cassette support 77 are shifted to the left, and the side 81 enters the notch or groove 46 while the side 82 enters the notch or groove 49, and the guide element 76 passes between the rails 40 and 41, the handle being then moved forwardly until the cassette support assumes the third position, upon its forward outer edge engaging with the forward side of the supporting structure. After the third exposure is completed, the handle 81 is manipulated to shift the cassette support to the fourth exposure position. The handle 80 and cassette support 77 are again shifted to the left, so that the side 81 enters the notch or groove 46 and the side 82 enters the notch or groove 47, and the guide element 76 engages the outer edge of the rail 39. The handle is again moved forwardly to bring the cassette support to the fifth exposure position, with its forward outer edge engaging the forward side of the supporting structure. After the fifth exposure is completed, the handle is manipulated to shift the cassette support to the sixth exposure position, as is obvious, and after the completion of the sixth exposure the cassette support is bodily removed from the supporting structure.

In Figure 9, I have shown a cassette support for making a single large picture upon a film or plate of the same size as used in connection with the cassette support 49. In connection with this form of cassette support, the window element 58 is not employed, as the window 24 is used without any window element. The window element 24 has an area substantially equal to the area of the film or plate. The cassette support is designated by the numeral 83, and has an internal dimension identical with that of the cassette support 49, but its dimension transversely of the supporting structure is increased by means of an extension 84. This extension is of such a size that when the cassette support is shifted forwardly so that the extension engages the forward side of the supporting structure, the cassette support 83 will be centered with respect to the window 24. The cassette support is provided with a handle 85, rigidly secured thereto, having sides 86 and 87, adapted for insertion within the notches or grooves 46 and 43. This cassette support also has the same small guide element 76, which is adapted to pass between the rails 40 and 41. After the single exposure has been made, the cassette support is bodily removed from the supporting structure.

The numeral 88 designates a centering element, in the form of a rectangular frame, having a rectangular opening 89. This frame 88 is carried by a slidable strap or bar 90, arranged within the recess or passage 37, and operating within guides 91. The strap 90 has its outer end bent upwardly to form a stop 92. When the strap 90 is forced forwardly or inwardly so that the stop 92 engages the outer guide 91, the frame 88 of the centering element will be in the center of the bottom opening 23, and also in the center of the window 24. I also provide a sight element 93, which may be used with or without the centering element. This sight element has an opening, and is in the form of an eye, and this eye is carried by a slidable rod 94, preferably square in cross-section, held within a T coupling 95 by a set screw 95'. The rod 94 has a head or stop 96 on its outer end. The T-coupling 95 is carried by a vertical post 97, which is preferably detachably secured to the supporting structure by a suitable clamp 98. When the rod 94 is shifted to the extreme outer position, the eye 93 is disposed outwardly of the window 24, and when the rod 94 is shifted to the extreme inner position, with the head 96 engaging the coupling 95, the eye 93 will have its center in vertical alignment with the center of the window 24, and the center of the bottom opening 23. The post 97 is preferably square in cross-section, so that it will not turn within the clamped device, and the post may be vertically adjusted by proper manipulation of the clamp device.

In making a fluoroscopic examination of a patient for determining the suspected area of the portion of the stomach, the patient is laid upon the supporting structure, face down, as shown in Figure 10. The frame or centering element 88 is now in the outer position, and the sight element 93 is in the outer position. The X-ray tube is arranged beneath the supporting structure, so that the X-rays may pass upward through the opening 23, and the fluoroscopic screen is supported above the patient. In this manner, the patient may be given a thorough fluoroscopic examination, and when the suspected portion is located, the centering element 88 is shifted to the extreme inner position, so that it will be centered with respect to the bottom opening and window 24. The sight element 93 is also shifted to the innermost position, to be centered with respect to the window 24, whereby the center of the sight opening is centered with respect to the centering element 88. The centering element 88 is arranged between the patient and the fluoroscopic screen. The operator then looks downwardly through the sight element 93, and by carefully moving the patient, the suspected part is brought to the center of the centering element. The suspected part will be seen by the operator, as occurring between the sight element 93 and the centering element 88. If desired, the radiographs or pictures, may be taken immediately with the patient in the precise proper position. If this is to be done, the sight element 93 must be shifted to the outer position, and the fluoroscopic screen removed. The X-ray bulb beneath the machine is rendered inactive, and an X-ray bulb is arranged above the supporting structure and above the patient, the cone of the X-ray apparatus being centered with respect to the sight element 93, prior to the same being shifted to the outer position. The multiplicities of pictures may now be taken, as explained in connection with the several cassette supports. If it should not be desired to immediately take the pictures, after the suspected portion has been centered within the frame 88, by the use of the sight element 93, the location of the suspected portion is marked upon the body of the patient. The patient may therefore, be removed from the supporting structure, and may again be replaced upon the same and the suspected portion properly centered with respect to the window 24, by the operator looking downwardly through the sight element 93, and moving or shifting the patient until the mark is in vertical alignment with the sight opening. The fluoroscopic examination may also be made independently of the present apparatus, by other means of localization and the skin marked, with reference to the suspected portion, and the suspected portion may be centered with regard to the window 24, by use of the sight element 93, as explained.

It is, of course, understood that in making the exposures, in connection with the several cassette supports, that the X-ray tube is arranged above the supporting structure, and above the patient, and the cone of the X-ray is centered with relation to the window.

The invention is in no sense restricted to making the exposures in the multiples indicated, as the same may be widely varied.

The invention is also in no sense restricted to making pictures of the stomach, as it may be used to make pictures of any other part of the body, as is obvious.

It is to be understood that the forms of my invention herewith shown and described are to be taken as preferred examples of the same, and that various changes in the shape, size and arrangement of parts may be resorted to without departing from the spirit of my invention, or the scope of the subjoined claims.

Having fully described my invention, what I claim is:—

1. An X-ray or radiographic apparatus, comprising a supporting structure having a top impervious to X-rays and provided in such top with a window through which the X-rays may pass, a cassette support bodily shiftable within the supporting structure, a handle secured to the cassette support to shift the same and embodying spaced elongated bars, guide devices secured to the supporting structure for slidably receiving the elongated bars, and transverse stop bars spaced longitudinally of the elongated bars and secured thereto and arranged for engagement with the guide devices.

2. An X-ray or radiographic apparatus, comprising a supporting structure having a top impervious to X-rays and provided in such top with a window through which the X-rays may pass and also having an opening at one side, a cassette support movable into the supporting structure through the side opening and bodily shiftable within the supporting structure, a handle substantially rigidly secured to the cassette support to shift the same in all directions and being free from connection with the supporting structure, spaced guide devices secured to the supporting structure for slidably engaging the handle upon its longitudinal movement, spaced guide devices within the supporting structure and corelated with the first-named guide devices, and a guide element secured to the cassette support for coaction with the last-named guide devices.

3. An X-ray or radiographic apparatus, comprising a supporting structure having a top impervious to X-rays and provided in such top with a window through which the X-rays may pass and also having an opening at its side, a cassette support movable into the supporting structure through the side opening, a handle substantially fixedly secured to the cassette support to shift the same, spaced guide devices secured to the supporting structure near its side opening, spaced guide devices arranged within the supporting structure and corelated with the first-named guide devices, a guide element secured to the cassette support for engagement with the second-named guide devices while the handle is adapted for slidable engagement with the first-named guide devices, and stop elements secured to the handle and spaced longitudinally of the same and arranged to engage the first-named guide devices.

4. An X-ray or radiographic apparatus, comprising a supporting structure having a top impervious to X-rays and provided with a window through which X-rays may pass, a centering element having an opening adapted to assume a position so that the center of its opening substantially registers with the center of the window, said centering element being arranged adjacent to the window, and a sight element supported above the top of the supporting structure and having an opening, the arrangement being such that the center of the opening of the sight element is to be brought into vertical alignment with the center of the opening of the centering element.

5. An X-ray or radiographic apparatus, comprising a supporting structure having a top impervious to X-rays and provided in the top with a window through which X-rays may pass, a centering element having an opening, a slidable support attached to the supporting structure near the window and carrying the centering element so that the centering element may be shifted to the center of the window and also to a position outside of the window, a sight element having an opening, and a slidable support for the sight element for supporting the same at a point above and spaced from the window and to permit the sight element to be shifted to a position in alignment with the center of the window and to a position outside of the window.

6. An X-ray or radiographic apparatus, comprising a supporting structure having a top impervious to X-rays and provided in such top with a window through which X-rays may pass, a cassette support arranged beneath the window, a handle secured to the cassette support to shift the same in all directions and extending to the exterior of the supporting structure, stationary substantially parallel spaced guide elements secured to the supporting structure, a member secured to the cassette support for engagement with the guide elements and to be shifted longitudinally of the same, and means corelated with the guide elements and handle and having guides for indicating the extent of lateral movement of the handle with relation to the guide elements and also serving to guide the handle during its longitudinal movement.

7. An X-ray or radiographic apparatus, comprising a supporting structure having a top impervious to X-rays and provided in such top with a window through which X-rays may pass, a cassette support arranged beneath the window, a handle secured to the cassette support to shift the same in all directions and extending to the exterior of the supporting structure, stationary substantially parallel spaced guide elements secured to the supporting structure and arranged substantially parallel with the handle, a member secured to the cassette support for engagement with the guide elements and to be shifted longitudinally of the same, a set of spaced guide devices secured to the supporting structure and extending at substantially a right angle to the guide elements, said guide devices being adapted for engagement with the handle and serving to indicate the extent of lateral shifting movements of the handle and also serving to guide the handle in its longitudinal movements, said handle having a stop element for engagement with the guide devices.

8. An X-ray or radiographic apparatus comprising a supporting structure having a top impervious to X-rays and provided substantially centrally in such top with a window through which X-rays may pass, a cassette support for arrangement within the supporting structure, spaced parallel guide devices arranged within the cassette support and extending in a forwardly direction, a guide element secured to the forward portion of the cassette support for coaction with the guide devices for positively guiding the forward portion of the cassette support during its forward and rearward movements and breaking such guiding action when the cassette support is shifted to the rearmost position so that such cassette support may be shifted laterally, a handle substantially rigidly attached to the cassette support and projecting to the exterior of the supporting structure, guide devices for the handle arranged near the rear edge of the supporting structure and serving to guide the handle in its forward and rearward movements against lateral displacement, and a stop element carried by the handle to engage with the last named guide devices upon the rearward movement of the handle.

9. An X-ray or radiographic apparatus comprising a supporting structure having a top impervious to X-rays and provided in such top with a window through which X-rays may pass, a cassette support for arrangement within the supporting structure, means for forming spaced guide grooves within the supporting structure which extend in a forward direction, a guide element secured to the forward portion of the cassette support for movement within selected guide grooves so that the forward portion of the cassette support is guided during its forward and rearward movements against lateral displacement, the arrangement being such that the guiding action is broken when the cassette support is shifted to the rearmost exposure position so that the cassette support may be shifted laterally, a handle substantially rigidly secured to the rear portion of the cassette support and extending to the exterior of the supporting structure, means secured to the supporting structure near its rear edge and having laterally spaced grooves for receiving the handle, said handle being guided when within the groove during its rearward movement against lateral displacement, and a plurality of stop elements longitudinally spaced upon the handle to engage with the last named means upon the rearward movement of the handle.

10. An X-ray or radiographic apparatus comprising a supporting structure having a top impervious to X-rays and provided in such top with a window through which X-rays may pass, a cassette support for arrangement beneath the top, a handle substantially rigidly attached to the cassette support and extending to the exterior of the supporting structure, means to guide the cassette support when shifted in a direction longitudinally of the handle and holding the same against lateral displacement, such guiding action being broken when the cassette support is shifted to one extreme exposure position so that the cassette supported may then be laterally shifted, and means to guide the handle during its longitudinal movement against lateral displacement, the guiding of the handle being broken by raising the handle so that it may then be shifted laterally.

11. An X-ray or radiographic apparatus comprising a supporting structure having a top impervious to X-rays and provided in such top with a window through which X-rays may pass, a cassette support for arrangement within the supporting structure, means for forming spaced guide grooves within the supporting structure which extend in a forward direction, a guide element secured to the forward portion of the cassette support for movement within selected guide grooves so that the forward portion of the cassette support is guided during its forward and rearward movements against lateral displacement, the arrangement being such that the guiding action is broken when the cassette support is shifted to the rearmost exposure position so that the cassette support may then be shifted laterally, a handle substantially rigidly secured to the rear portion of the cassette support and extending to the exterior of the supporting structure, means secured to the supporting structure near its rear edge and having lateral spaced grooves for receiving the handle, said handle being guided when within the groove during its rear movement against laterally displacement, the grooves for the handle being correlated with the guide grooves.

12. An X-ray or radiographic apparatus, comprising a supporting structure having a top impervious to X-rays and provided in such top with a window through which the X-rays may pass and also having an opening at its side, a cassette support movable into and out of the supporting structure through the side opening, a handle substantially rigidly secured to the cassette support to shift the same in all directions, substantially parallel spaced guide devices arranged within the supporting structure and extending in a forwardly direction, and a guide element secured to the cassette support for detachable engagement with the guide devices, the arrangement of the guide element and the guide devices being such that the guide element disengages the guide devices so that the cassette support may be shifted laterally when such cassette support is in the rearmost exposure position.

13. An X-ray or radiographic apparatus, comprising a supporting structure having a top impervious to X-rays and provided in such top with a window through which the X-rays may pass and also having an opening at its side, a cassette support movable into and out of the supporting structure through the side opening and bodily shiftable within the supporting structure, a handle secured to the cassette support so that the cassette support cannot move perceptibly with relation to the handle, and spaced guide devices secured to the supporting structure for slidable engagement with the handle to guide the handle in its rearward movement, said guide devices also holding the handle against lateral displacement.

14. An X-ray or radiographic apparatus, comprising a supporting structure having a top impervious to X-rays and provided in such top with a window through which the X-rays may pass and also having an opening at its side, a cassette support movable into and out of the supporting structure through the side opening and bodily shiftable within the supporting structure, a handle fixedly secured to the cassette support to shift the same in all directions, spaced guide devices secured to the supporting structure to slidably engage with the handle to guide the same in its longitudinal movement and also serving to hold the handle against lateral displacement, and a stop element carried by the handle to engage with the guide devices.

15. An X-ray or radiographic apparatus, comprising a supporting structure having a top impervious to X-rays and provided in such top with a window through which the X-rays may pass, a cassette support bodily shiftable within the supporting structure, a handle secured to the cassette support to shift the same, guide devices secured to the supporting structure to slidably engage with the handle to guide the same in its rearward movement and also serving to hold the handle against lateral displacement, and a plurality of stop devices carried by the handle and spaced longitudinally of the handle and arranged for engagement with the guide devices upon the rearward movement of the handle.

WALTER A. WEED.